(12) United States Patent
Yoshikawa et al.

(10) Patent No.: US 12,373,280 B2
(45) Date of Patent: *Jul. 29, 2025

(54) COMPUTER-READABLE RECORDING MEDIUM STORING INFORMATION PROCESSING PROGRAM, INFORMATION PROCESSING METHOD, AND INFORMATION PROCESSING APPARATUS

(71) Applicant: Fujitsu Limited, Kawasaki (JP)

(72) Inventors: Daiki Yoshikawa, Handa (JP); Toru Kitayama, Kobe (JP); Yusuke Hara, Kawasaki (JP); Kenichirou Shimogawa, Numazu (JP)

(73) Assignee: Fujitsu Limited, Kawasaki (JP)

( * ) Notice: Subject to any disclaimer, the term of this patent is extended or adjusted under 35 U.S.C. 154(b) by 12 days.

This patent is subject to a terminal disclaimer.

(21) Appl. No.: 18/243,308

(22) Filed: Sep. 7, 2023

(65) Prior Publication Data

US 2024/0211341 A1 Jun. 27, 2024

(30) Foreign Application Priority Data

Dec. 26, 2022 (JP) .................. 2022-208903

(51) Int. Cl.
*G06F 11/00* (2006.01)
*G06F 9/48* (2006.01)
*G06F 11/07* (2006.01)

(52) U.S. Cl.
CPC ......... *G06F 11/0793* (2013.01); *G06F 9/485* (2013.01); *G06F 11/0721* (2013.01)

(58) Field of Classification Search
CPC ............ G06F 11/0766; G06F 11/0793; G06F 11/079; G06F 11/076
See application file for complete search history.

(56) References Cited

U.S. PATENT DOCUMENTS

2019/0243740 A1 8/2019 Kambe et al.

FOREIGN PATENT DOCUMENTS

| | | | |
|---|---|---|---|
| JP | 2003341157 A | * | 12/2003 |
| JP | 2015-204036 | | 11/2015 |

(Continued)

OTHER PUBLICATIONS

US Office Action dated Jan. 16, 2025 for U.S. Appl. No. 18/474,378.
(Continued)

*Primary Examiner* — Katherine Lin
(74) *Attorney, Agent, or Firm* — STAAS & HALSEY LLP

(57) ABSTRACT

A recording medium stores a program causing a computer to execute a process including: detecting an abnormality of a first job in a job group, which has an execution order defined in a job flow; determining, by referring to a memory that stores a condition for restarting the job flow and information which indicates a job as a starting point from which the job flow is to be restarted in the job group, whether the detected abnormality of the first job satisfies a condition for restarting the job flow; and restarting, when determining that the detected abnormality of the first job satisfies the condition for restarting the job flow, based on information which indicates a second job as a starting point from which the job flow is to be restarted, and is associated with the first job, the job flow from the second job as the starting point.

7 Claims, 10 Drawing Sheets

(56) References Cited

FOREIGN PATENT DOCUMENTS

| | | |
|---|---|---|
| JP | 2019-139262 | 8/2019 |
| JP | 2020-160817 | 10/2020 |
| JP | 2022-133010 | 9/2022 |

OTHER PUBLICATIONS

US Office Action dated Dec. 4, 2024 for U.S. Appl. No. 18/474,378.
U.S. Appl. No. 18/474,378, filed Sep. 26, 2023, Daiki Yoshikawa, Fujitsu Limited.

* cited by examiner

FIG. 6

| JOB FLOW NAME | JOB ID | JOB NAME | PRECEDING JOB ID | FOLLOWING JOB ID |
|---|---|---|---|---|
| JOB FLOW A | 1 | JOB 1 | n/a | 2 |
| JOB FLOW A | 2 | JOB 2 | 1 | 3 |
| JOB FLOW A | 3 | JOB 3 | 2 | 4 |
| JOB FLOW A | 4 | JOB 4 | 3 | 9 |
| JOB FLOW A | 5 | JOB 5 | n/a | 7 |
| JOB FLOW A | 6 | JOB 6 | n/a | 7 |
| JOB FLOW A | 7 | JOB 7 | 5,6 | 8 |
| JOB FLOW A | 8 | JOB 8 | 7 | 9 |
| JOB FLOW A | 9 | JOB 9 | 4,8 | 10 |
| JOB FLOW A | 10 | JOB 10 | 9 | n/a |

FIG. 7

| JOB FLOW NAME | JOB ID | JOB NAME | RESTART CONDITION | RESTARTING POINT |
|---|---|---|---|---|
| JOB FLOW A | 1 | JOB 1 | n/a | n/a |
| JOB FLOW A | 2 | JOB 2 | Code<0 | JOB 2 |
| JOB FLOW A | 3 | JOB 3 | Code<0 | JOB 1 |
| JOB FLOW A | 4 | JOB 4 | Code<=1 | JOB 1 |
| JOB FLOW A | 4 | JOB 4 | Code>=2 | JOB 2 |
| JOB FLOW A | 5 | JOB 5 | n/a | n/a |
| JOB FLOW A | 6 | JOB 6 | n/a | n/a |
| JOB FLOW A | 7 | JOB 7 | n/a | n/a |
| JOB FLOW A | 8 | JOB 8 | Code<=1 | JOB 5 AND JOB 6 |
| JOB FLOW A | 8 | JOB 8 | Code>=2 | JOB 7 |
| JOB FLOW A | 9 | JOB 9 | n/a | n/a |
| JOB FLOW A | 10 | JOB 10 | n/a | n/a |

| JOB FLOW NAME | JOB ID | JOB NAME | JOB STATUS | JOB END CODE |
|---|---|---|---|---|
| JOB FLOW A | 1 | JOB 1 | NORMAL END | 0 |
| JOB FLOW A | 2 | JOB 2 | NORMAL END | 0 |
| JOB FLOW A | 3 | JOB 3 | NORMAL END | 0 |
| JOB FLOW A | 4 | JOB 4 | ABNORMAL END | 1 |
| JOB FLOW A | 5 | JOB 5 | NORMAL END | 0 |
| JOB FLOW A | 6 | JOB 6 | NORMAL END | 0 |
| JOB FLOW A | 7 | JOB 7 | NORMAL END | 0 |
| JOB FLOW A | 8 | JOB 8 | ABNORMAL END | 2 |
| JOB FLOW A | 9 | JOB 9 | WAITING FOR EXECUTION | n/a |
| JOB FLOW A | 10 | JOB 10 | WAITING FOR EXECUTION | n/a |

COMPUTER-READABLE RECORDING MEDIUM STORING INFORMATION PROCESSING PROGRAM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2022-208903, filed on Dec. 26, 2022, the entire contents of which are incorporated herein by reference.

FIELD

The embodiment discussed herein is related to a computer-readable recording medium storing an information processing program, an information processing method, and an information processing apparatus.

BACKGROUND

In the related art, there is a system that executes a job group in accordance with a job flow. In a case where an abnormality occurs in one job of the job group and the one job is ended, the entire job flow is also ended for now, and thus it is desirable to restart the job flow.

Japanese Laid-open Patent Publication No. 2020-160817, Japanese Laid-open Patent Publication No. 2019-139262, Japanese Laid-open Patent Publication No. 2015-204036, and Japanese Laid-open Patent Publication No. 2022-133010 are disclosed as related art.

SUMMARY

According to an aspect of the embodiments, a non-transitory computer-readable recording medium stores an information processing program causing a computer to execute a process including: detecting an abnormality of a first job in a job group, which has an execution order defined in a job flow; determining, by referring to a memory that stores, in association with at least one job in the job group, a condition for restarting the job flow and information which indicates a job as a starting point from which the job flow is to be restarted in the job group, whether or not the detected abnormality of the first job satisfies a condition for restarting the job flow, which is associated with the first job; and restarting, in a case where it is determined that the detected abnormality of the first job satisfies the condition for restarting the job flow, which is associated with the first job, by referring to the memory, based on information which indicates a second job as a starting point from which the job flow is to be restarted, and is associated with the first job, the job flow from the second job as the starting point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of storing the job flow;

FIG. 7 is an explanatory diagram illustrating an example of contents stored in a restart information management table;

DESCRIPTION OF EMBODIMENTS

As the related art, for example, there is a technique in which, in a case where a new error of a job is detected and a plurality of recovery candidates are specified at the same time, a recovery process of the job is executed based on a priority correspondence order. For example, there is another technique for making a determination regarding an abnormality of a target job, based on a reference timing or a reference time changed based on monitoring information acquired by monitoring a monitoring target associated with the target job. For example, there is still another technique for re-executing a job specified by specific information of a notification destination job of an event corresponding to specific information of a notification source job of the event. For example, there is still another technique for returning a state of a system to a state before a target job and a job having a dependency relationship when the target job is executed are executed.

For example, in a case where an abnormality occurs in any job, a method of restarting a job flow from a job serving as a starting point set in advance among the job in which the abnormality occurs, a job immediately before the job in which the abnormality occurs, a job existing at a head of the job flow, and the like is conceivable. Meanwhile, it is difficult to appropriately set the job serving as the starting point from which the job flow is to be restarted by the method described above. For example, a plurality of jobs may not be set as starting points from which the job flow is to be restarted.

According to one aspect, an object of the present disclosure is to appropriately set a job serving as a starting point from which a job flow is to be restarted.

Hereinafter, an embodiment of an information processing program, an information processing method, and an information processing apparatus according to the present disclosure will be described in detail with reference to the drawings.

(Example of Information Processing Method According to Embodiment)

Figure 1:
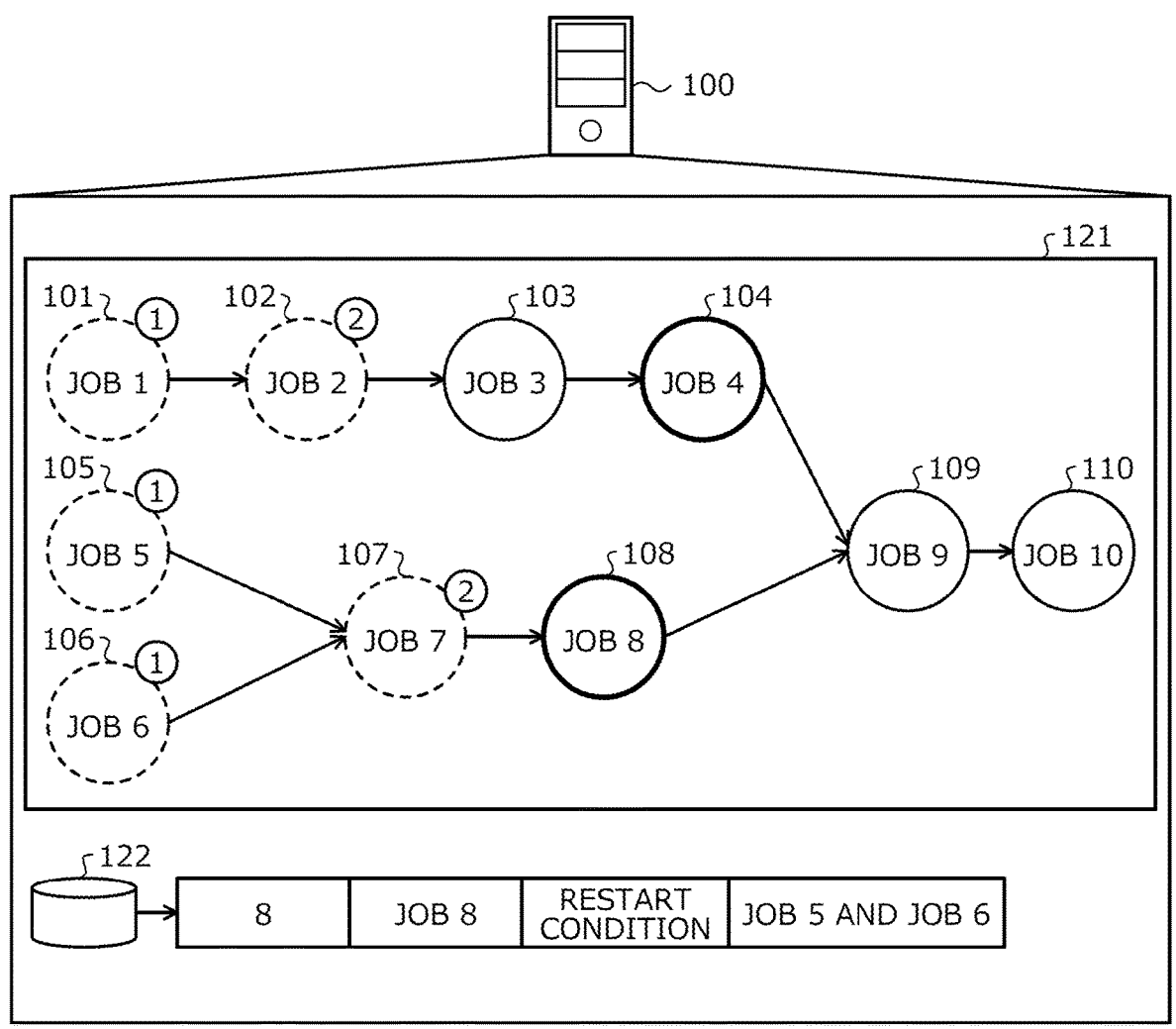
FIG. 1 is an explanatory diagram illustrating an example of an information processing method according to an embodiment.

FIG. 1 is an explanatory diagram illustrating an example of an information processing method according to an embodiment. The information processing apparatus 100 is a computer that starts a job flow. For example, the information processing apparatus 100 is a server, a personal computer (PC), or the like.

For example, the job flow defines an execution order in a job group. The job flow indicates, for example, a data dependency relationship in the job group. Any job in the job group may be a job that uses data output by each of a plurality of jobs. The plurality of jobs may use data output by any job of the job group.

The job flow may be represented by, for example, a directed graph including a node representing each job in a job group and a directed edge coupling the nodes respectively representing two different jobs in the job group. For example, the directed edge couples a node representing any one job of the job group to a node representing another job that is executed next to the one job and uses data output by the one job.

Another job represented by a node that is reachable by reversely tracing a directed edge from a node representing a certain job is handled as a job preceding the certain job in an execution order. Another job represented by a node that is reachable by sequentially tracing a directed edge from a node representing a certain job is handled as a job behind the certain job in an execution order. Another job represented by a node that is unreachable by tracing a directed edge in order or in reverse from a node representing a certain job is handled as a job parallel to the certain job. A certain job and another job parallel to the certain job may be executed in parallel.

Starting means that execution of a job group having an execution order defined in a job flow is started. Completing all the jobs in the job group corresponds to completing the job flow. According to the job flow, it is considered that after the execution of the job group is started, an abnormality occurs in any job of the job group, and the any job is ended.

For example, an abnormality includes an error due to a timeout, an error due to an environment in which a job is executed, an error due to processing contents of the job, an error due to processing contents of another job preceding the job in an execution order, or the like. In a case where an abnormality occurs in any one job in a job group and the one job is ended, a job flow is also ended for now.

Therefore, it is desirable to restart the job flow. At this time, the job group includes jobs waiting for execution and already executed jobs. The executed job may be a job that is already executed but is preferably re-executed to resolve the abnormality of the one job. The executed job may be a job that may not be re-executed. The executed job may be a job that may cause an error by being re-executed and is preferably not re-executed.

For example, depending on a type of abnormality that occurs in any job, which job is a job that is preferable to be re-executed may be changed. For example, when a job flow is restarted, there is a case where an abnormality of any job may not be solved unless a job which is preferably re-executed is re-executed. For example, when the job flow is restarted, re-execution of a job that does not have to be re-executed may lead to an increase in processing load and processing time taken to complete the job flow. Accordingly, it is desirable that a job serving as a starting point from which the job flow is to be restarted be flexibly changeable.

Meanwhile, it is difficult to appropriately set the job serving as the starting point from which the job flow is to be restarted. For example, in a case where an abnormality occurs in any job, there is a problem in that a job serving as a starting point from which a job flow is to be restarted may not be switched in accordance with a type of the abnormality.

By contrast, in a case where an abnormality occurs in a certain job, a method is conceivable in which a job flow is restarted from a job serving as a starting point set in advance, such as the certain job itself, another job executed immediately before the certain job, or still another job existing at a head of the job flow. For example, in the method described above, in a case where an abnormality occurs in a certain job, by using a job flow branching technique, the job flow is controlled in accordance with an error code related to the abnormality such that the job flow branches from the certain job to another single job preceding the certain job in an execution order.

Even with the method described above, it may be difficult to appropriately set the job serving as a starting point from which the job flow is to be restarted. With the method described above, for example, in a case where an abnormality occurs in any job, there is a problem in that only a single job may be set as a starting point from which a job flow is to be restarted, and a plurality of jobs may not be set.

For example, in a case where an abnormality occurs in any one job, an operator of a job flow preferably handles the abnormality before the job flow is restarted, in some cases. By contrast, according to the method described above, in a case where the abnormality occurs in the one job, execution of another job serving as a branch destination is automatically started, and thus the operator of the job flow may not have room to handle the abnormality.

In the present embodiment, an information processing method capable of easily and appropriately setting a job serving as a starting point from which a job flow is to be restarted will be described.

In FIG. 1, the information processing apparatus 100 stores a job flow 121. For example, the job flow 121 defines an execution order in a job group. For example, in the example illustrated in FIG. 1, the job group includes jobs 1 to 10. The job flow 121 indicates, for example, a data dependency relationship in the job group.

The job flow 121 is represented by a directed graph including nodes 101 to 110 representing the jobs 1 to 10, respectively. A node 10$i$ representing a job i and a node 10$j$ representing a job j that is executed next to the job i and uses data output by the job i are coupled by a directed edge. Accordingly, the directed edge indicates a data dependency relationship.

According to the job flow 121, the information processing apparatus 100 executes the job group. For example, the information processing apparatus 100 sequentially executes the job 1, the job 2, the job 3, and the job 4. For example, the information processing apparatus 100 executes the job 5 and the job 6 in parallel. For example, after the job 5 and the job 6 are completed, the information processing apparatus 100 sequentially executes the job 7 and the job 8. For example, the information processing apparatus 100 may execute the jobs 1 to 4 and the jobs 5 to 8 in parallel. For example, after the job 4 and the job 8 are completed, the information processing apparatus 100 sequentially executes the job 9 and the job 10.

The information processing apparatus 100 includes a storage unit 122. The storage unit 122 stores one or more combinations of a condition for restarting the job flow 121 and information indicating one or more jobs serving as starting points from which the job flow 121 is to be restarted in the job group, in association with at least one job of the job group. The condition is, for example, that a certain abnormality occurs in any one job. The condition may be, for example, that a specific type of abnormality occurs in the one job.

For example, in the example illustrated in FIG. 1, the information processing apparatus 100 causes the storage unit 122 to store, in association with the job 8, a condition for restarting the job flow 121 and information indicating the jobs 5 and 6 serving as starting points from which the job flow 121 is to be restarted, in the job group. The condition is, for example, that a certain abnormality occurs in the job 8. The condition may be, for example, that a specific type of abnormality occurs in the job 8.

(1-1) The information processing apparatus 100 detects an abnormality of a first job in a job group. The information processing apparatus 100 may specify a type of occurring abnormality of the first job. In a case where execution of the first job fails due to the abnormality of the first job in the job group, the information processing apparatus 100 ends the job flow 121 for now without completing the job flow 121.

Accordingly, in a case where the information processing apparatus 100 fails to execute the first job due to the abnormality of the first job in the job group, when there is another job being executed in the job group, the execution of the another job may also fail in the same manner. Therefore, due to the abnormality of the first job, an abnormality of the another job may occur. The abnormality of the another job is, for example, a forcible execution failure due to the abnormality of the first job.

For example, in the example illustrated in FIG. 1, it is assumed that the information processing apparatus 100 detects an abnormality of the job 8 of the job group. For example, the information processing apparatus 100 may specify a type of occurring abnormality of the job 8. Here, in the information processing apparatus 100, it is assumed that, when the abnormality occurs in the job 8 in the job group, there is no other job being executed in the job group, and no abnormality occurs in the other job in the job group.

(1-2) The information processing apparatus 100 refers to the storage unit 122 to specify a condition for restarting the job flow 121 associated with the first job, and determines whether or not the detected abnormality of the first job satisfies the specified condition. For example, in a case where the condition associated with the first job indicates that any abnormality occurs in the first job, the information processing apparatus 100 determines that the detected abnormality of the first job satisfies the condition associated with the first job.

For example, in a case where the condition associated with the first job indicates that a specific type of abnormality occurs in the first job, when a type of the detected abnormality of the first job is the specific type, the information processing apparatus 100 determines that the condition associated with the first job is satisfied. For example, in a case where the condition associated with the first job indicates that a specific type of abnormality occurs in the first job, when a type of the detected abnormality of the first job is not the specific type, the information processing apparatus 100 determines that the condition associated with the first job is not satisfied.

For example, in the example illustrated in FIG. 1, it is assumed that the information processing apparatus 100 determines that the detected abnormality of the job 8 satisfies the condition for restarting the job flow 121 associated with the job 8. Thus, the information processing apparatus 100 may determine that it is preferable to use information indicating a job serving as a starting point from which the job flow 121 is to be restarted in the job group, which is stored in the storage unit 122 in association with the first job.

(1-3) In a case where it is determined that the condition is satisfied, the information processing apparatus 100 refers to the storage unit 122 to acquire information indicating one or more second jobs as a starting point from which the job flow 121 is to be restarted associated with the first job. Based on the information indicating the one or more second jobs serving as the starting point from which the job flow 121 is to be restarted, the information processing apparatus 100 restarts the job flow 121 from each of the second jobs serving as the starting point.

For example, in the example illustrated in FIG. 1, since it is determined that the condition is satisfied, the information processing apparatus 100 refers to the storage unit 122 to acquire information indicating the jobs 5 and 6 serving as the starting point from which the job flow 121 is to be restarted in the job group, which is associated with the job 8. For example, based on the acquired information, the information processing apparatus 100 restarts the job flow 121 from the jobs 5 and 6 as starting points.

For example, when the job flow 121 is restarted, the information processing apparatus 100 sequentially executes, from the jobs 5 and 6 as the starting points, another job behind the jobs 5 and 6 in an execution order. For example, when the job flow 121 is restarted, it is preferable that the information processing apparatus 100 sequentially execute other jobs that are not executed, among other parallel jobs to the jobs 5 and 6 as starting points. Here, for example, it is assumed that the information processing apparatus 100 completes the jobs 1 to 4 and waits for execution of the jobs 9 and 10 before restarting the job flow 121.

For example, when the job flow 121 is restarted, the information processing apparatus 100 executes the jobs 5 and 6 in parallel. For example, after the jobs 5 and 6 are completed, the information processing apparatus 100 sequentially executes the jobs 7 and 8. For example, since the job 4 is also completed after the job 8 is completed, the information processing apparatus 100 sequentially executes the jobs 9 and 10.

Thus, the information processing apparatus 100 may appropriately control a job serving as a starting point from which the job flow 121 is to be restarted. For example, in a case where an abnormality occurs in any job, the information processing apparatus 100 may switch the jobs serving as starting points from which the job flow 121 is to be restarted in accordance with a type of the abnormality. For example, when an abnormality occurs in any one job, the information processing apparatus 100 may set a plurality of jobs as starting points from which the job flow 121 is to be restarted. Therefore, the information processing apparatus 100 may efficiently restart the job flow 121, and may reduce a processing load and a processing time taken to complete all the jobs in the job group.

Here, although the case where the information processing apparatus 100 restarts the job flow 121 without waiting for an operation input by a user of the information processing apparatus 100 in a case where it is determined that the condition is satisfied is described, the embodiment is not limited thereto. The user of the information processing apparatus 100 is, for example, an operator of the job flow 121, an administrator of the job flow 121, or the like. For example, in a case where it is determined that the condition is satisfied, the information processing apparatus 100 may restart the job flow 121 after waiting for a specific operation input by the user of the information processing apparatus 100. For example, the specific operation input is an operation input indicating that the restart of the job flow 121 is permitted. Thus, before the information processing apparatus 100 restarts the job flow 121, the operator of the job flow 121, the administrator of the job flow 121, or the like may easily handle an abnormality that occurs in any job.

Here, although the case where the information processing apparatus 100 operates alone is described, the embodiment is not limited to this. For example, there may be a case where the information processing apparatus 100 is in cooperation with another computer. For example, there may be a case where the information processing apparatus 100 does not execute the job group by itself, and controls the another computer that executes the job group. For example, there may be a case where a plurality of computers implements the function as the information processing apparatus 100 in cooperation with each other. For example, there may be a case where the function as the information processing apparatus 100 is implemented over a cloud. An example of a case where the information processing apparatus 100 cooperates with the another computer will be described below with reference to FIG. 2.

(Example of Information Processing System 200)

Next, an example of an information processing system 200 in which the information processing apparatus 100 illustrated in FIG. 1 is applied will be described with reference to FIG. 2.

Figure 2:
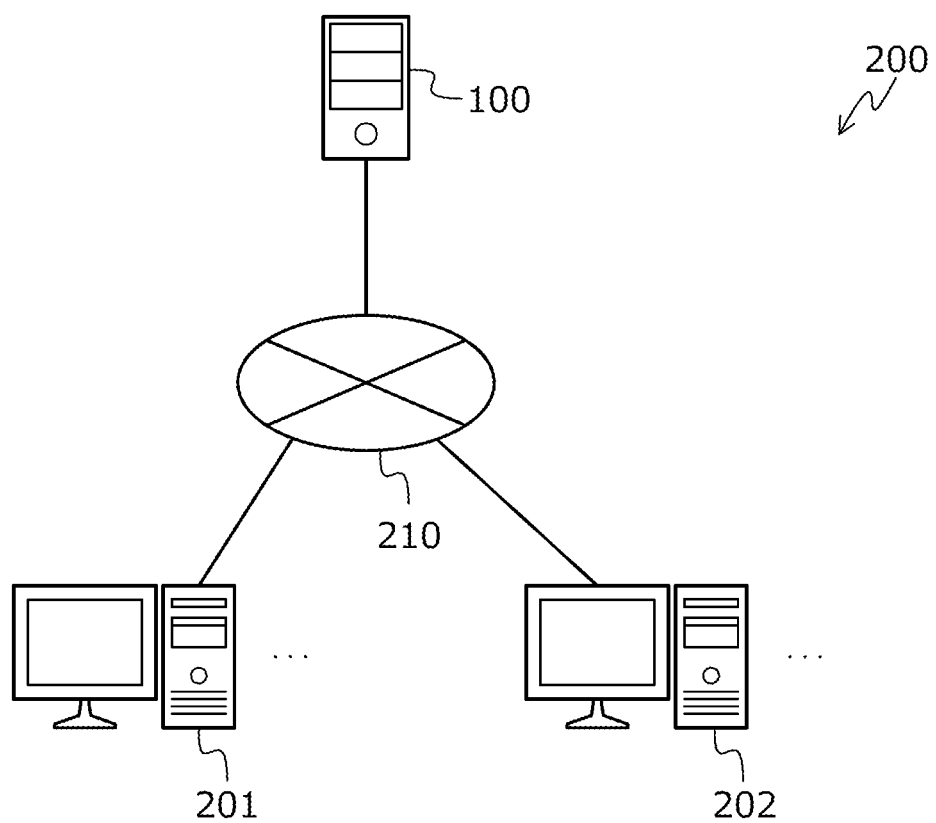
FIG. 2 is an explanatory diagram illustrating an example of an information processing system.

FIG. 2 is an explanatory diagram illustrating an example of the information processing system 200. In FIG. 2, the information processing system 200 includes the information processing apparatus 100, one or more job execution apparatuses 201, and a client apparatus 202.

In the information processing system 200, the information processing apparatus 100 and the job execution apparatus 201 are coupled to each other via a wired or wireless network 210. For example, the network 210 is a local area network (LAN), a wide area network (WAN), the Internet, or the like. In the information processing system 200, the information processing apparatus 100 and the client apparatus 202 are coupled to each other via the wired or wireless network 210.

The information processing apparatus 100 is a computer that starts a job flow. The information processing apparatus 100 stores the job flow. The information processing apparatus 100 receives a start trigger for starting execution of the job group. For example, the information processing apparatus 100 receives a request for requesting the execution of the job group from the client apparatus 202 as the start trigger for starting the execution of the job group.

The information processing apparatus 100 controls the one or more job execution apparatuses 201. For example, the information processing apparatus 100 distributes the job group to the one or more job execution apparatuses 201. For example, the information processing apparatus 100 controls the one or more job execution apparatuses 201 such that each job execution apparatus 201 executes a job distributed to the job execution apparatus 201, in accordance with the job flow.

For example, in response to reception of the start trigger, the information processing apparatus 100 controls the one or more job execution apparatuses 201 such that each job execution apparatus 201 executes a job distributed to the job execution apparatus 201, and starts the job flow.

The information processing apparatus 100 has a storage unit that stores one or more combinations of a condition for restarting a job flow and information indicating one or more jobs serving as starting points from which the job flow is to be restarted in a job group, in association with at least one job of the job group.

The information processing apparatus 100 detects an abnormality of a first job executed by any job execution apparatus 201, in the job group. For example, the information processing apparatus 100 detects the abnormality of the first job, by receiving a notification indicating the abnormality of the first job from any job execution apparatuses 201. For example, the notification may include information indicating a type of abnormality of the first job. For example, the information processing apparatus 100 specifies the type of occurring abnormality of the first job based on the notification.

For example, when detecting the abnormality of the first job, the information processing apparatus 100 controls one or more job execution apparatuses 201 such that a job flow is abnormally ended without being completed. By referring to the storage unit, the information processing apparatus 100 determines whether or not the detected abnormality of the first job satisfies a condition for restarting the job flow, which is associated with the first job. When it is determined that the condition is satisfied, the information processing apparatus 100 refers to the storage unit to specify one or more second jobs, based on information indicating the one or more second jobs serving as starting point from which the job flow is to be restarted, which is associated with the first job.

The information processing apparatus 100 restarts the job flow, from each second job of the specified one or more second jobs as a starting point. For example, the information processing apparatus 100 controls one or more job execution apparatuses 201 to execute all or a part of the job group, from each second job of the specified one or more second jobs as the starting point.

After completing all jobs in the job group and completing the job flow, the information processing apparatus 100 transmits, to the client apparatus 202, a notification indicating that all the jobs in the job group are completed and the job flow is completed. For example, the information processing apparatus 100 is a server, a PC, or the like.

The job execution apparatus 201 is a computer that executes any job in a job group. Under the control of the information processing apparatus 100, the job execution apparatus 201 executes a job distributed to the job execution apparatus 201. When a job to be executed next to the job allocated to the job execution apparatus 201 is distributed to another job execution apparatus 201, the job execution apparatus 201 transmits data output by the job distributed to the job execution apparatus 201 to the another job execution apparatus 201 to which the job to be executed next is distributed.

In a case where an abnormality of the job allocated to the job execution apparatus 201 occurs, the job execution apparatus 201 generates a notification indicating the abnormality of the job allocated to the job execution apparatus 201, and transmits the notification to the information processing apparatus 100. For example, the job execution apparatus 201 may specify a type of abnormality of the job allocated to the job execution apparatus 201, generate a notification that includes information indicating the specified type of abnormality of the job and represents the abnormality of the job allocated to the job execution apparatus 201, and transmit the notification to the information processing apparatus 100. For example, the job execution apparatus 201 is a server, a PC, or the like.

The client apparatus 202 is a computer used by a user of the information processing system 200. The user of the information processing system 200 is, for example, an operator of a job flow, an administrator of the job flow, or the like. For example, the client apparatus 202 generates a request for requesting execution of a job group based on an operation input by the user of the information processing system 200, and transmits the request to the information processing apparatus 100.

For example, the client apparatus 202 receives a notification indicating that all jobs in the job group are completed and the job flow is completed, from the information processing apparatus 100. For example, the client apparatus 202 outputs the notification indicating that all the jobs in the job group are completed and the job flow is completed such that the user of the information processing system 200 may refer to the notification. For example, the information processing apparatus 100 is a PC, a tablet terminal, a smartphone, or the like.

Here, although the case where the information processing apparatus 100 and the job execution apparatus 201 are different apparatuses is described above, the embodiment is not limited thereto. For example, there may be a case where the information processing apparatus 100 also operate as the job execution apparatus 201 by having the function of the job execution apparatus 201.

Here, although the case where the information processing apparatus 100 and the client apparatus 202 are different apparatuses is described above, the embodiment is not limited thereto. For example, there may be a case where the information processing apparatus 100 also operates as the client apparatus 202 by having the function of the client apparatus 202.

(Hardware Configuration Example of Information Processing Apparatus 100)

Next, a hardware configuration example of the information processing apparatus 100 will be described with reference to FIG. 3.

Figure 3:
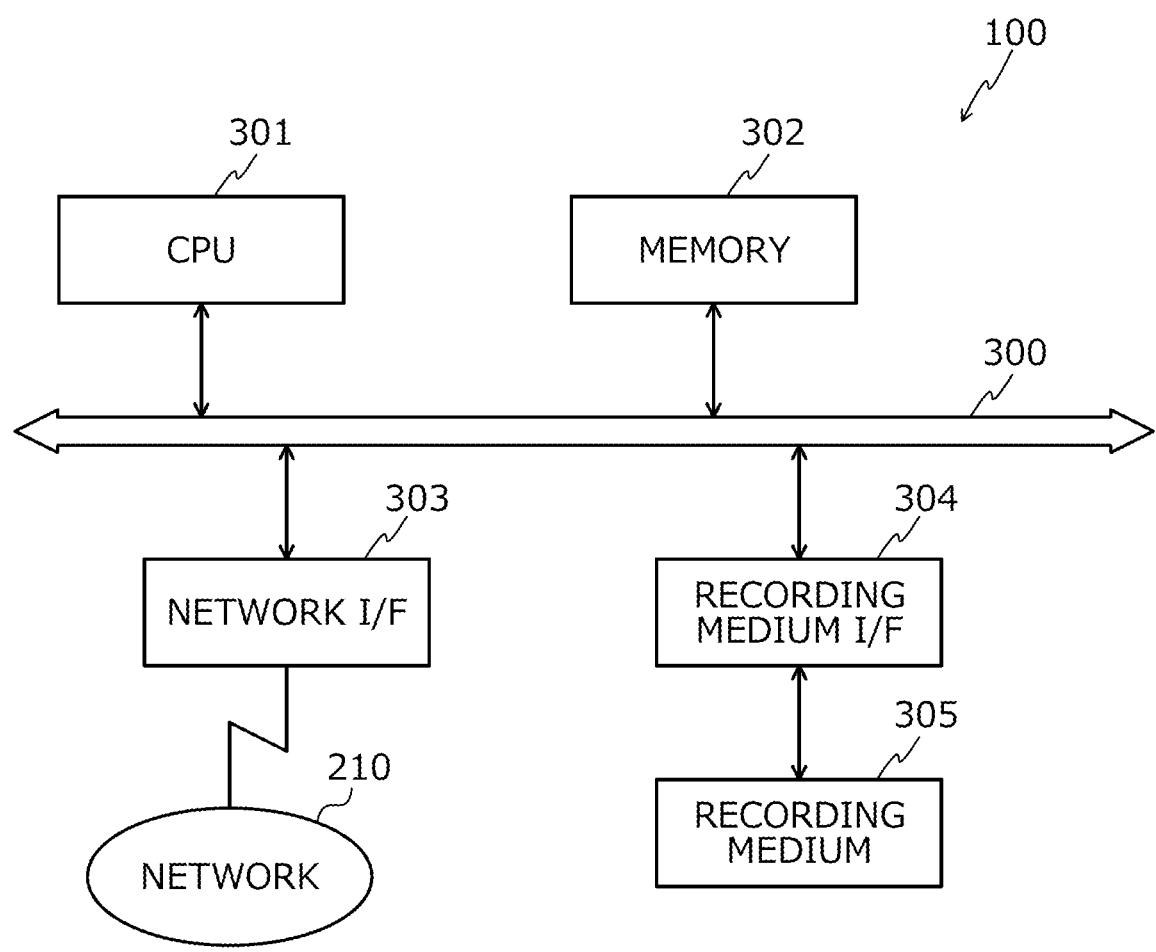
FIG. 3 is a block diagram illustrating a hardware configuration example of an information processing apparatus.

FIG. 3 is a block diagram illustrating the hardware configuration example of the information processing apparatus 100. In FIG. 3, the information processing apparatus 100 includes a central processing unit (CPU) 301, a memory 302, a network interface (I/F) 303, a recording medium I/F 304, and a recording medium 305. The respective components are coupled to each other by a bus 300.

The CPU 301 controls the entire information processing apparatus 100. The memory 302 includes, for example, a read-only memory (ROM), a random-access memory (RAM), a flash ROM, and the like. For example, the flash ROM or the ROM stores various programs, and the RAM is used as a work area of the CPU 301. The program stored in the memory 302 is loaded by the CPU 301, and thus causes the CPU 301 to execute coded processing.

The network I/F 303 is coupled to the network 210 through a communication line, and is coupled to another computer via the network 210. The network I/F 303 manages an interface between the network 210 and an internal interface, and controls an input and an output of data from the another computer. The network I/F 303 is, for example, a modem, a LAN adapter, or the like.

The recording medium I/F 304 controls reading and writing of data from and to the recording medium 305 in accordance with control of the CPU 301. The recording medium I/F 304 is, for example, a disk drive, a solid-state drive (SSD), a Universal Serial Bus (USB) port, or the like. The recording medium 305 is a nonvolatile memory that stores data written under the control of the recording medium I/F 304. The recording medium 305 is, for example, a disk, a semiconductor memory, a USB memory, or the like. The recording medium 305 may be removably attached to the information processing apparatus 100.

In addition to the components described above, the information processing apparatus 100 may include a keyboard, a mouse, a display, a printer, a scanner, a microphone, a speaker, or the like, for example. The information processing apparatus 100 may include a plurality of recording medium I/Fs 304 and a plurality of recording media 305. The information processing apparatus 100 does not have to include the recording medium I/F 304 or the recording medium 305.

(Hardware Configuration Example of Job Execution Apparatus 201)

A hardware configuration example of the job execution apparatus 201 has, for example, the same manner as the hardware configuration example of the information processing apparatus 100 illustrated in FIG. 3, and thus description thereof is omitted.

(Hardware Configuration Example of Client Apparatus 202)

For example, a hardware configuration example of the client apparatus 202 has the same manner as the hardware configuration example of the information processing apparatus 100 illustrated in FIG. 3, and thus description thereof is omitted.

In the following description, a case where the information processing apparatus 100 operates alone and executes a job group will be mainly described.

(Functional Configuration Example of Information Processing Apparatus 100)

Next, a functional configuration example of the information processing apparatus 100 will be described with reference to FIG. 4.

Figure 4:
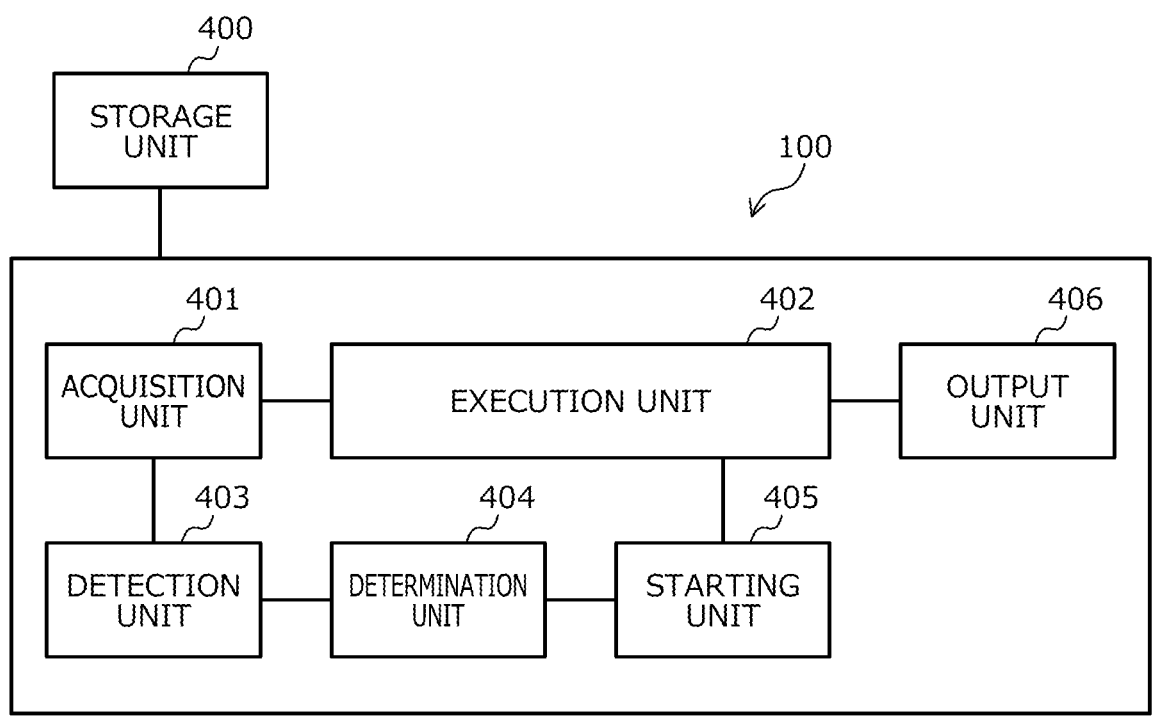
FIG. 4 is a block diagram illustrating a functional configuration example of the information processing apparatus.

FIG. 4 is a block diagram illustrating the functional configuration example of the information processing apparatus 100. The information processing apparatus 100 includes a storage unit 400, an acquisition unit 401, an execution unit 402, a detection unit 403, a determination unit 404, a starting unit 405, and an output unit 406.

The storage unit 400 is implemented by, for example, a storage region of the memory 302, the recording medium 305, or the like illustrated in FIG. 3. Hereinafter, a case will be described where the storage unit 400 is included in the information processing apparatus 100. Meanwhile, the embodiment is not limited to this. For example, there may be a case where the storage unit 400 is included in an apparatus different from the information processing apparatus 100 and contents stored in the storage unit 400 may be referred to from the information processing apparatus 100.

The acquisition unit 401 to the output unit 406 function as an example of a control unit. For example, the functions of the acquisition unit 401 to the output unit 406 are implemented by causing the CPU 301 to execute a program stored in a storage region of the memory 302, the recording medium 305, or the like illustrated in FIG. 3, or by using the network I/F 303. For example, a processing result of each functional unit is stored in the storage region of the memory 302, the recording medium 305, or the like illustrated in FIG. 3.

The storage unit 400 stores various types of information to be referred to or updated in processing performed by each functional unit. For example, the storage unit 400 stores a job flow. For example, the job flow defines an execution order in a job group. The job flow indicates, for example, a data dependency relationship in the job group. Any job in the job group may be a job that uses data output by each of a plurality of jobs. The plurality of jobs may use data output by any job of the job group.

The job flow may be represented by, for example, a directed graph including a node representing each job in a job group and a directed edge coupling the nodes respectively representing two different jobs in the job group. For example, the directed edge couples a node representing any one job of the job group to a node representing another job that is executed after the one job by one job in the execution order and uses data output by the one job. For example, the storage unit 400 stores the job flow, by using a job flow management table 600. An example of the job flow management table 600 will be described below with reference to FIG. 6, for example.

The storage unit 400 stores, for example, one or more combinations of a condition for restarting a job flow and information indicating one or more jobs serving as starting points from which the job flow is to be restarted in a job group, in association with at least one job of the job group. The condition is, for example, that a certain abnormality occurs in any one job. The condition may be, for example, that a specific type of abnormality occurs in the one job. For example, the storage unit 400 stores one or more combinations of a condition for restarting a job flow and information indicating one or more jobs serving as starting points from which the job flow is to be restarted in a job group, in association with any one job, by using a restart information management table 700. An example of the restart information management table 700 will be described below with reference to FIG. 7, for example.

For example, the storage unit 400 stores information indicating an end status of each job in a job group at a time when a job flow is abnormally ended. The abnormal end of the job flow means that the job flow is ended without being completed. The end status indicates whether a job is waiting for execution, is ended normally, or is ended abnormally. The abnormal end of the job means that the job is ended without being completed. For example, the storage unit 400 stores an execution history management table 800 for managing an end status of each job of the job group. An example of the execution history management table 800 will be described below with reference to FIG. 8, for example.

In a case where a job flow is abnormally ended, for example, when an abnormality of any one job occurs and the one job is abnormally ended, the storage unit 400 may store information indicating a type of abnormality of the one job. For example, an abnormality includes an error due to a timeout, an error due to an environment in which a job is executed, an error due to processing contents of the job, an error due to processing contents of another job preceding the job in an execution order, or the like. For example, the storage unit 400 stores information indicating the type of abnormality of the job in the execution history management table 800. The example of the execution history management table 800 will be described below with reference to FIG. 8, for example.

The acquisition unit 401 acquires various types of information to be used in processing of each functional unit. The acquisition unit 401 stores the acquired various types of information in the storage unit 400, or outputs the acquired various types of information to each functional unit. The acquisition unit 401 may output the various types of information stored in the storage unit 400 to each functional unit. For example, the acquisition unit 401 acquires various types of information, based on an operation input by a user of the information processing apparatus 100. The user of the information processing apparatus 100 is, for example, an operator of a job flow, an administrator of the job flow, or the like. For example, the acquisition unit 401 may receive the various types of information from an apparatus different from the information processing apparatus 100.

For example, the acquisition unit 401 acquires a request for requesting execution of a job group. For example, the acquisition unit 401 acquires a request for requesting execution of a job group by receiving an input of the request, based on an operation input by a user of the information processing apparatus 100. For example, the acquisition unit 401 may acquire a request for requesting execution of a job group by receiving the request from another computer.

For example, the acquisition unit 401 acquires information for detecting an abnormal end of the job flow. For example, the acquisition unit 401 acquires a notification indicating that the job flow is abnormally ended. For example, the notification is issued by the information processing apparatus 100 when the job flow is abnormally ended. For example, the notification may be issued by the execution unit 402.

For example, the acquisition unit 401 acquires information for detecting an abnormality of a first job in a job group. For example, the acquisition unit 401 acquires information indicating an end status of each job in the job group at a time when the job flow is abnormally ended. The end status indicates whether a job is waiting for execution, is ended normally, or is ended abnormally. For example, the acquisition unit 401 acquires the execution history management table 800.

The acquisition unit 401 may receive a start trigger for starting processing of any functional unit. For example, the start trigger occurs when a predetermined operation input is performed by the user of the information processing apparatus 100. The start trigger may be, for example, reception of predetermined information from another computer. For example, the start trigger may also be an output of predetermined information from any of the functional units.

For example, the acquisition unit 401 may receive acquisition of a request for requesting execution of a job group, as a start trigger for starting processing of the execution unit 402. For example, the acquisition unit 401 may receive, as a start trigger for starting processing of the detection unit 403, acquisition of information for detecting an abnormal end of the job flow. For example, the acquisition unit 401 may receive, as a start trigger for starting processing of the detection unit 403, acquisition of information for detecting an abnormality of a first job in the job group.

The execution unit 402 sequentially executes a job group according to a job flow. For example, in a case where the acquisition unit 401 acquires a request for requesting execution of the job group, the execution unit 402 sequentially executes the job group in accordance with the job flow. Thus, the execution unit 402 may execute the job group, and may complete the job flow.

For example, in a case where the job flow is restarted by the starting unit 405, the execution unit 402 sequentially executes all or a part of the job group in accordance with the job flow, from each second job of one or more second jobs serving as starting points from which the job flow is to be restarted, as starting points. For example, the execution unit 402 executes another job behind each second job serving as the starting point in the execution order.

At this time, for example, the execution unit 402 does not re-execute another job that is already executed among other jobs parallel to each second job serving as the starting point. For example, the execution unit 402 executes, in accordance with the job flow, another job that is not executed among the other jobs in parallel with each second job serving as the starting point. Thus, the execution unit 402 may appropriately re-execute all or part of the job group, and may restart and complete the job flow.

In a case where any one job is abnormally ended due to an abnormality of the one job, the execution unit 402 abnormally ends the job flow without completing the job flow. In a case where there is a job being executed when the job flow is abnormally ended without being completed, the execution unit 402 abnormally ends the job. For example, in a case where the job flow is abnormally ended without being completed, the execution unit 402 reflects an end status of each job in the execution history management table 800. In a case where any one job is ended abnormally due to an abnormality of the one job, the execution unit 402 may reflect information indicating a type of the abnormality of the one job in the execution history management table 800.

Thus, in a case where the job flow is abnormally ended without being completed, the execution unit 402 may keep the end status of each job useful when the job flow is restarted, and thus it is possible to easily determine how to restart the job flow. In a case where an abnormality of any one job occurs, the execution unit 402 may keep information indicating the type of the abnormality of the one job, and thus it is possible to easily determine how to restart the job flow.

The detection unit 403 detects an abnormality of a first job of a job group. For example, the detection unit 403 detects the abnormality of the first job based on information for detecting the abnormality of the first job in the job group acquired by the acquisition unit 401. For example, when the first job is abnormally ended, based on information indicating the end status of each job in the job group, which is acquired by the acquisition unit 401, the detection unit 403 determines that the abnormality of the first job occurs, and detects the abnormality of the first job. Thus, the detection unit 403 may obtain a guideline for restarting the job flow.

When the detection unit 403 detects an abnormality of a first job, the determination unit 404 refers to the storage unit 400 to determine whether or not one or more conditions for restarting a job flow, which are associated with the first job, exist.

In a case where it is determined that one or more conditions exist, the determination unit 404 refers to the storage unit 400 to determine whether or not the abnormality of the first job detected by the detection unit 403 satisfies any condition for restarting the job flow, which is associated with the first job. For example, the determination unit 404 refers to the storage unit 400 to specify one or more conditions for restarting the job flow, which are associated with the first job. For example, in a case where a first condition among the one or more specified conditions indicates that any abnormality occurs in the first job, the determination unit 404 determines that the abnormality of the first job detected by the detection unit 403 satisfies the first condition.

For example, in a case where the first condition among the one or more specified conditions indicates that a specific type of abnormality occurs in the first job, the determination unit 404 specifies the type of abnormality of the first job by referring to the storage unit 400. For example, in a case where the specified type coincides with the specific type indicated by the first condition, the determination unit 404 determines that the first condition is satisfied. For example, in a case where the specified type does not coincide with the specific type indicated by the first condition, the determination unit 404 determines that the first condition is not satisfied.

Thus, the determination unit 404 may determine whether or not to restart the job flow. Based on whether or not any condition of the one or more conditions for restarting the job flow, which are associated with the first job, is satisfied, the determination unit 404 may flexibly change the second job serving as a starting point from which the job flow is to be restarted.

In a case where the determination unit 404 determines that any one condition is satisfied, the starting unit 405 restarts the job flow. For example, the starting unit 405 refers to the storage unit 400 to acquire information indicating one or more second jobs serving as starting points from which the job flow is to be restarted, which are associated with the first job and combined with the one condition determined to be satisfied by the determination unit 404. For example, the starting unit 405 restarts the job flow based on the acquired information from each second job of one or more second jobs as a starting point.

For example, the starting unit 405 controls the execution unit 402 to execute, in accordance with the job flow, from each second job of one or more second jobs as a starting point, another job behind the second job in the execution order and still another job that is not executed in parallel with the second job. For example, the starting unit 405 sets each second job of one or more second jobs as the starting point in the execution unit 402.

Thus, the starting unit 405 may appropriately set a job serving as a starting point from which the job flow is to be restarted, may appropriately complete the job group, and may appropriately complete the job flow. The starting unit 405 may make it easier for the execution unit 402 to complete the job flow. For example, the starting unit 405 may complete the job group without execution of all in the job group by the execution unit 402, and a processing load and a processing time may be reduced.

When the determination unit 404 determines that one or more conditions for restarting the job flow associated with the first job do not exist, the starting unit 405 restarts the job flow from any one job set in advance as a starting point. The one job set in advance is any job of the first job, a job immediately before the first job, and a job at a head of the job flow.

For example, the starting unit 405 controls the execution unit 402 to execute, in accordance with the job flow, from any one job set in advance as a starting point, another job behind the one job in the execution order, and still another job that is not executed in parallel with the one job.

Thus, even when a job serving as a starting point from which the job flow is to be restarted is not set, the starting unit 405 may restart the job flow, may complete the job group, and may complete the job flow. The starting unit 405 may make it easier for the execution unit 402 to complete the job flow. For example, the starting unit 405 may complete the job group without execution of all in the job group by the execution unit 402, and a processing load and a processing time may be reduced.

When the determination unit 404 determines that none of the conditions is satisfied, the starting unit 405 restarts the job flow from any job set in advance as a starting point. The one job set in advance is any job of the first job, a job immediately before the first job, and a job at a head of the job flow.

For example, the starting unit 405 controls the execution unit 402 to execute, in accordance with the job flow, from any one job set in advance as a starting point, another job behind the one job in the execution order, and still another job that is not executed in parallel with the one job.

Thus, even when a job serving as a starting point from which the job flow is to be restarted is not set, the starting unit 405 may restart the job flow, may complete the job group, and may complete the job flow. The starting unit 405 may make it easier for the execution unit 402 to complete the job flow. For example, the starting unit 405 may complete the job group without execution of all in the job group by the execution unit 402, and a processing load and a processing time may be reduced.

The output unit 406 outputs a processing result of at least any functional unit. For example, an output form is displayed on a display, output to a printer for printing, transmission to an external apparatus through the network I/F 303, or storage in a storage region of the memory 302, the recording medium 305, or the like. Thus, the output unit 406 may notify the user of the information processing apparatus 100 of the processing result of at least any one functional unit, and may improve convenience of the information processing apparatus 100.

For example, the output unit 406 outputs a notification indicating that the job flow is completed to be referred to by the user of the information processing apparatus 100. Thus, the output unit 406 enables the user of the information processing apparatus 100 to grasp that the job flow is completed.

(Operation Example of Information Processing Apparatus 100)

Next, an operation example of the information processing apparatus 100 will be described with reference to FIGS. 5 to 9. First, an example in which the information processing apparatus 100 stores a job flow 500 by using the job flow management table 600 will be described with reference to FIGS. 5 and 6.

Figure 5:
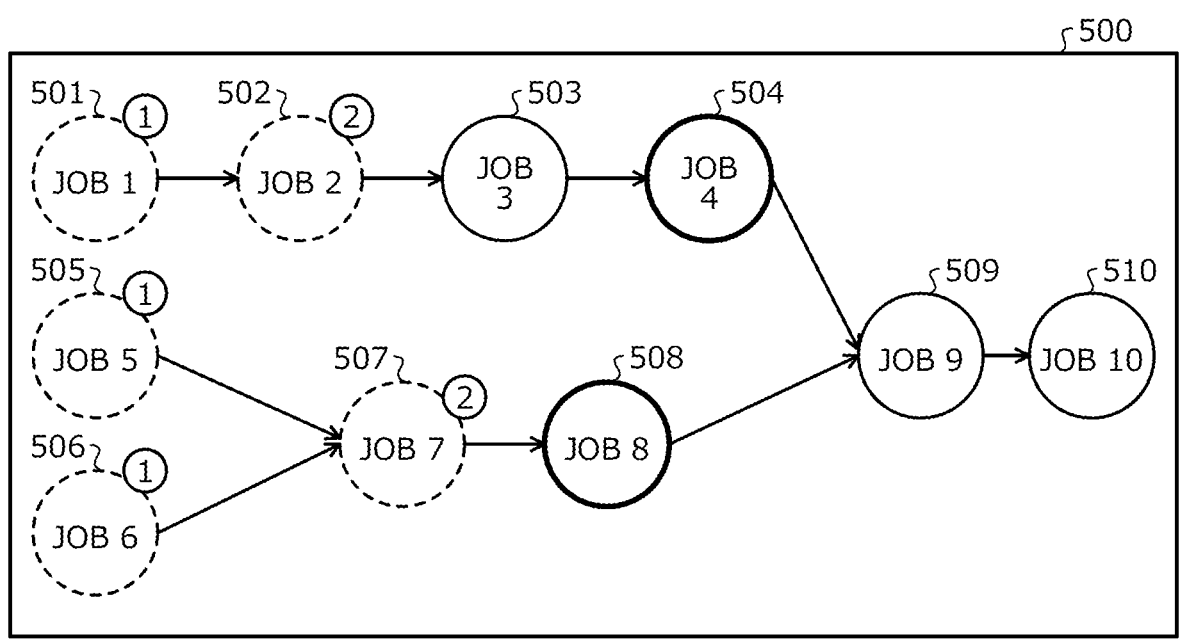
FIG. 5 is an explanatory diagram illustrating an example of a job flow.

FIG. 5 is an explanatory diagram illustrating an example of the job flow 500. As illustrated in FIG. 5, the job flow 500 defines an execution order in a job group. For example, in the example illustrated in FIG. 5, the job group includes jobs 1 to 10. The job flow 500 indicates a data dependency relationship in the job group.

For example, the job flow 500 is represented by a directed graph including nodes 501 to 510 representing the jobs 1 to 10, respectively. A node 50$i$ representing a job i and a node 50$j$ representing a job j that is executed next to the job i and uses data output by the job i are coupled by a directed edge. Accordingly, the directed edge indicates a data dependency relationship. Next, description will be continued with reference to FIG. 6.

FIG. 6 is an explanatory diagram illustrating an example of storing the job flow 500. In FIG. 6, the information processing apparatus 100 stores the job flow 500 by using the job flow management table 600. The job flow management table 600 is implemented by a storage region such as the memory 302 or the recording medium 305 of the information processing apparatus 100 illustrated in FIG. 3, for example.

As illustrated in FIG. 6, the job flow management table 600 has fields of a job flow name, a job ID, a job name, a preceding job ID, and a following job ID. A record 600-$a$ indicating job-related information is stored in the job flow management table 600 by setting information in each field for each job. "a" is an arbitrary integer.

A job flow name assigned to the job flow that defines the execution order in the job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i.

A preceding job ID for identifying another job executed immediately before the one job identified by the job ID is set in the field of the preceding job ID. A following job ID for identifying another job executed immediately after the one job identified by the job ID is set in the field of the following job ID.

Next, an example of storage contents of the restart information management table 700 corresponding to the job flow 500, which is stored in the information processing apparatus 100, will be described with reference to FIG. 7. For example, the restart information management table 700 is implemented by a storage region such as the memory 302 or the recording medium 305 of the information processing apparatus 100 illustrated in FIG. 3.

FIG. 7 is an explanatory diagram illustrating an example of contents stored in the restart information management table 700. As illustrated in FIG. 7, the restart information management table 700 has fields of a job flow name, a job ID, a job name, a restart condition, and a restarting point. A record 700-$b$ indicating restart information is stored in the restart information management table 700 by setting information in each field for each job. "b" is an arbitrary integer. For example, a plurality of pieces of restart information may exist for one job.

A job flow name assigned to the job flow that defines the execution order in the job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i.

A condition for restarting the job flow by referring to restart information when any one job identified by the job ID abnormally ends is set in the field of the restart condition. In a case where the condition for restarting the job flow does not exist, "n/a" is set in the field of the restart condition.

For example, an end code representing a type of abnormality occurring in any one job identified by the job ID is set in the field of the restart condition, as a condition for restarting the job flow. The set end code indicates that, in a case where the type of abnormality that occurs in any one job identified by the job ID coincides with the specific type represented by the end code, the job flow is restarted by referring to the restart information.

Information indicating one or more jobs serving as starting points from which the job flow is to be restarted is set in the field of the restarting point. "n/a" is set in the field of the restart condition, and in a case where one or more jobs serving as starting points from which the job flow is to be restarted do not exist, "n/a" is set in the field of the restarting point, in the same manner. A job name assigned to each job of one or more jobs is set in the field of the restarting point as information indicating one or more jobs serving as starting points from which the job flow is to be restarted.

It is assumed that the information processing apparatus 100 sequentially starts execution of each job in a job group in accordance with the job flow 500. It is assumed that, since an abnormality occurs in any one job of the job group, the information processing apparatus 100 abnormally ends the job being executed and abnormally ends the job flow 500. It is assumed that the information processing apparatus 100 stores, in the execution history management table 800, execution history information indicating an end status of each job of the job group and an end code of each job of the job group at a time when the job flow 500 is abnormally ended.

Next, an example of storage contents of the execution history management table 800 in which the information processing apparatus 100 stores execution history information indicating an end status of each job in a job group will be described with reference to FIG. 8. For example, the execution history management table 800 is implemented by a storage region such as the memory 302 or the recording medium 305 of the information processing apparatus 100 illustrated in FIG. 3.

Figure 8:
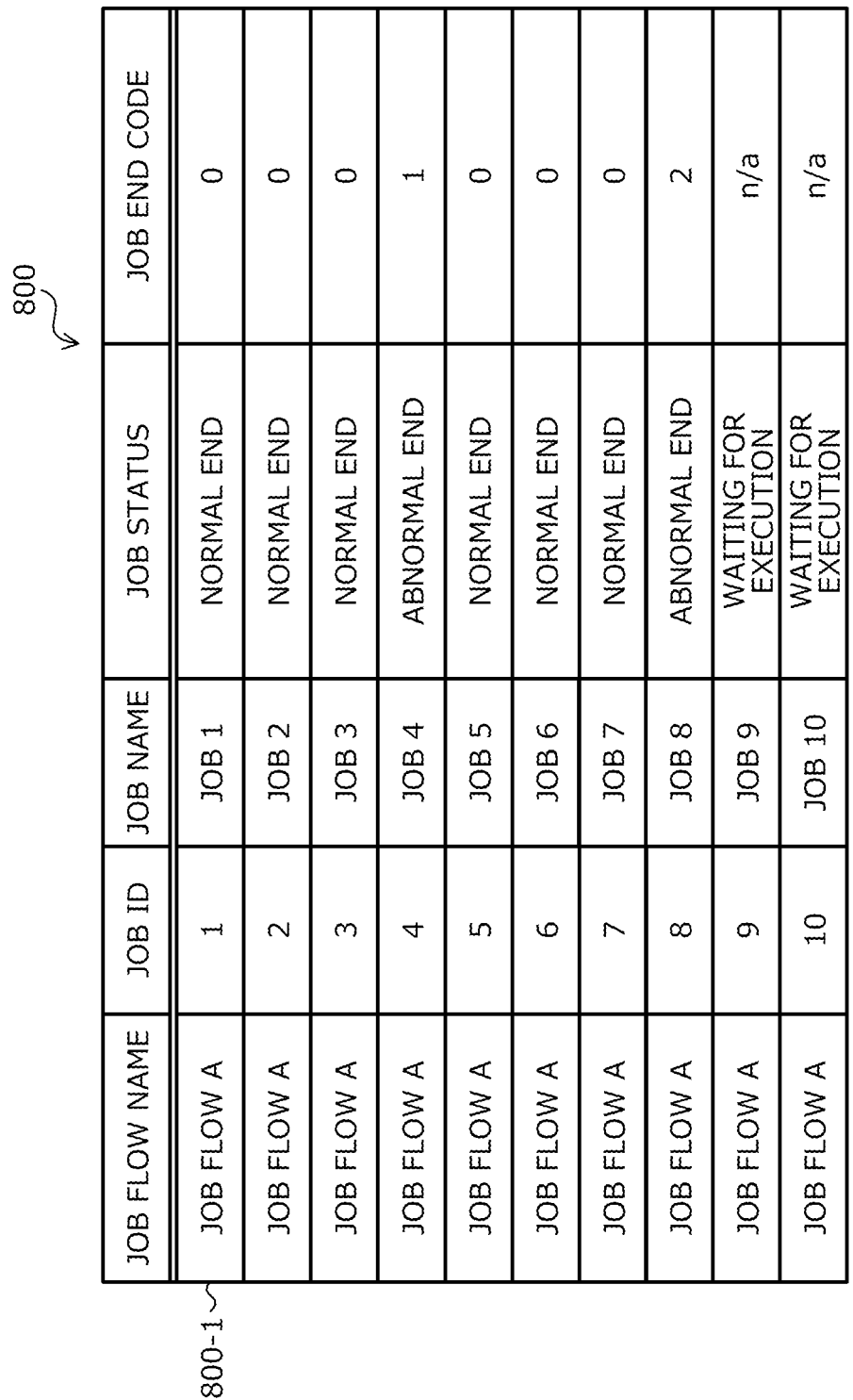
FIG. 8 is an explanatory diagram illustrating an example of contents stored in an execution history management table.

FIG. 8 is an explanatory diagram illustrating an example of contents stored in the execution history management table 800. As illustrated in FIG. 8, the execution history management table 800 has fields of a job flow name, a job ID, a job name, a job status, and a job end code. A record 800-*c* indicating execution history information is stored in the execution history management table 800 by setting information in each field for each job. "c" is an arbitrary integer.

A job flow name assigned to the job flow that defines the execution order in the job group is set in the field of the job flow name. For example, "job flow A" is set in the field of the job flow name as the job flow name assigned to the job flow 500.

A job ID for identifying any one job in the job group is set in the field of the job ID. For example, it is assumed that the job ID for identifying any one job i in the job group having the execution order defined in the job flow 500 is i. A job name assigned to the one job identified by the job ID is set in the field of the job name. For example, it is assumed that the job name assigned to the job i is the job i.

A status indicating an end status of the one job identified by the job ID is set in the field of the job status. The status indicates whether the one job identified by the job ID is abnormally ended, whether the one job identified by the job ID is normally ended, or whether the one job identified by the job ID is waiting for execution.

An end code of the one job identified by the job ID is set in the field of the end code of the job. For example, when a value of the end code is 0, the end code indicates that no abnormality occurs in the one job identified by the job ID and the one job identified by the job ID is normally ended. For example, when the value is equal to or more than one, the end code indicates that an abnormality occurs in the one job identified by the job ID and the one job identified by the job ID is abnormally ended. For example, in a case where the one job identified by the job ID is waiting for execution, the end code is "n/a".

Next, an example in which the information processing apparatus 100 restarts the job flow 500 by referring to the restart information management table 700 and the execution history management table 800 will be described with reference to FIG. 9.

Figure 9:
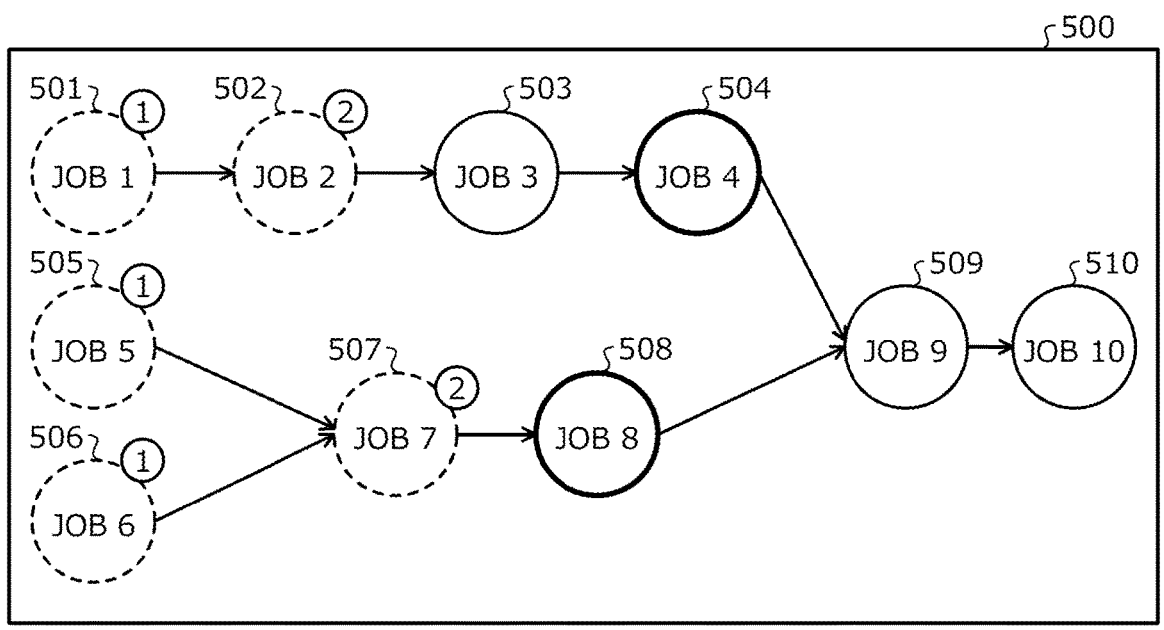
FIG. 9 is an explanatory diagram illustrating an example of restarting the job flow.

FIG. 9 is an explanatory diagram illustrating an example of restarting the job flow 500. In FIG. 9, when the job flow 500 is abnormally ended, the information processing apparatus 100 refers to the execution history management table 800 to specify one or more abnormally ended jobs, in a job group. For example, in the example illustrated in FIG. 9, the information processing apparatus 100 refers to the field of the "job status" in each record 800-*i* of the execution history management table 800, and specifies the abnormally ended jobs 4 and 8.

By referring to the execution history management table 800, the information processing apparatus 100 specifies an end code of the abnormally ended job. For example, in the example illustrated in FIG. 9, the information processing apparatus 100 refers to the field of the "job end code" in the record 800-4 corresponding to the abnormally ended job 4 in the execution history management table 800, and specifies the end code "1" corresponding to the job 4. In the same manner, for example, the information processing apparatus 100 refers to the field of the "job end code" in the record 800-8 corresponding to the abnormally ended job 8 in the execution history management table 800, and specifies the end code "2" corresponding to the job 8.

Before the job flow 500 is restarted, the information processing apparatus 100 may output information indicating the one or more abnormally ended jobs and the end code of each abnormally ended job such that an operator of the job flow 500 may refer to the information. When receiving a specific operation input by the operator of the job flow 500, the information processing apparatus 100 restarts the job flow 500.

Here, it is assumed that the information processing apparatus 100 receives a specific operation input by the operator of the job flow 500. Since the specific operation input by the operator of the job flow 500 is received, the information processing apparatus 100 restarts the job flow 500, as described in (9-1) to (9-5) to be described below.

(9-1) The information processing apparatus 100 refers to the field of "restart condition" in the record 700-*i* corresponding to each job of the one or more jobs abnormally ended in the restart information management table 700, and specifies one or more conditions corresponding to the job.

For example, in the example illustrated in FIG. 9, the information processing apparatus 100 reads the record 700-4 and the record 700-5 corresponding to the abnormally ended job 4, from the restart information management table 700. For example, the information processing apparatus 100 refers to the fields of the "restart condition" in the read records 700-4 and 700-5 to specify two conditions corresponding to the abnormally ended job 4. For example, the information processing apparatus 100 specifies the condition "Code ≤1" and the condition "Code ≥2" corresponding to the abnormally ended job 4.

In the same manner, for example, the information processing apparatus 100 reads the record 700-9 and the record 700-10 corresponding to the abnormally ended job 8, from the restart information management table 700. For example, the information processing apparatus 100 refers to the fields of the "restart condition" in the read records 700-9 and 700-10 to specify two conditions corresponding to the abnormally ended job 8. For example, the information processing apparatus 100 specifies the condition "Code ≤1" and the condition "Code ≥2" corresponding to the abnormally ended job 8.

(9-2) The information processing apparatus 100 determines whether or not the end code specified for each of the one or more abnormally ended jobs satisfies at least one of the one or more conditions corresponding to the specified job. For each of the abnormally ended jobs, the information processing apparatus 100 refers to the restart information management table 700 to specify one or more jobs serving as a starting point from which the job flow 500 is to be restarted, which are combined with a condition corresponding to the job determined to be satisfied. The information processing apparatus 100 registers, in a list, a combination of each of the one or more jobs abnormally ended and one or more jobs serving as a starting point from which the job flow 500 is to be restarted specified for the job.

For example, in the example illustrated in FIG. 9, the information processing apparatus 100 determines that the end code "1" specified for the abnormally ended job 4 satisfies the condition "Code ≤1" corresponding to the specified job 4. For example, for the abnormally ended job 4, the information processing apparatus 100 specifies the job 1 that is combined with the condition "Code ≤1" corresponding to the job 4 determined to be satisfied and that serves as a starting point from which the job flow 500 is to be restarted. For example, the information processing apparatus 100 registers, in the list, a combination of the abnormally ended job 4 and the job 1 serving as a starting point from which the job flow 500 is to be restarted, which is specified for the abnormally ended job 4.

For example, the information processing apparatus 100 determines that the end code "2" specified for the abnormally ended job 8 satisfies the condition "Code ≥2" corresponding to the specified job 8. For example, for the abnormally ended job 8, the information processing apparatus 100 specifies the job 7 that is combined with the condition "Code ≥2" corresponding to the job 8 determined to be satisfied and that serves as a starting point from which the job flow 500 is to be restarted. For example, the information processing apparatus 100 registers, in the list, a combination of the abnormally ended job 8 and the job 7 as a starting point from which the job flow 500 is to be restarted, which is specified for the abnormally ended job 8.

(9-3) A case where one or more conditions corresponding to any one job among the one or more abnormally ended jobs do not exist may be considered. In this case, the information processing apparatus 100 specifies, as a starting point from which the job flow 500 is to be restarted, a predetermined job set in advance among the one job, a job executed immediately before the one job, and a head job of the job flow 500. The information processing apparatus 100 registers a combination of the one job and the specified predetermined job in the list.

(9-4) A case in which none of one or more conditions corresponding to any one job among the one or more abnormally ended jobs is satisfied may be considered. In this case, the information processing apparatus 100 specifies, as a starting point from which the job flow 500 is to be restarted, a predetermined job set in advance among the one job, a job executed immediately before the one job, and a head job of the job flow 500. The information processing apparatus 100 registers a combination of the one job and the specified predetermined job in the list.

(9-5) The information processing apparatus 100 restarts the job flow 500 from each job registered in the list as a starting point from which the job flow 500 is to be restarted as a starting point such that the same job is not repeatedly executed. For example, in the example illustrated in FIG. 9, the information processing apparatus 100 restarts the job flow 500 from the jobs 1 and 7 registered in the list, which is a starting point from which the job flow 500 is to be restarted, as the starting point.

Thus, the information processing apparatus 100 may appropriately control a job serving as a starting point from which the job flow 500 is to be restarted. For example, in a case where an abnormality occurs in any job, the information processing apparatus 100 may switch the jobs serving as starting points from which the job flow 500 is to be restarted in accordance with a type of the abnormality.

For example, when an abnormality occurs in any one job, the information processing apparatus 100 may set a plurality of jobs as starting points from which the job flow 500 is to be restarted. Therefore, the information processing apparatus 100 may efficiently restart the job flow 500, and may reduce a processing load and a processing time taken to complete all the jobs in the job group.

After waiting for a specific operation input by the user of the information processing apparatus 100, the information processing apparatus 100 may restart the job flow 500. Therefore, before the information processing apparatus 100 restarts the job flow 500, the operator of the job flow 500, the administrator of the job flow 500, or the like may easily handle an abnormality that occurs in any job.

Here, although the case where the information processing apparatus 100 restarts the job flow 500 after receiving the specific operation input by the operator of the job flow 500 is described, the embodiment is not limited thereto. For example, there may be a case where the information processing apparatus 100 restarts the job flow 500 without receiving a specific operation input by the operator of the job flow 500. In this case, the information processing apparatus 100 may not output information indicating one or more abnormally ended jobs and an end code of each abnormally ended job such that the operator of the job flow 500 may refer to the information.

(Application Example of Information Processing Apparatus 100)

Next, an application example of the information processing apparatus 100 will be described. For example, in the data use field, the information processing apparatus 100 may be applied to a job flow of a large-scale system that collects, processes, and integrates data of several tens of business systems or more. Thus, the information processing apparatus 100 may flexibly restart the job flow of the large-scale system. Therefore, the information processing apparatus 100 may improve a restoration speed of the large-scale system at a time of an abnormality, improve stability of the large-scale system, or reduce an operation cost of the large-scale system.

(Restart Processing Procedure)

Next, an example of a restart processing procedure executed by the information processing apparatus 100 in response to an abnormal end of a job flow will be described with reference to FIG. 10. The restart processing is implemented by, for example, the CPU 301, a storage region such as the memory 302 or the recording medium 305, and the network I/F 303 illustrated in FIG. 3.

Figure 10:
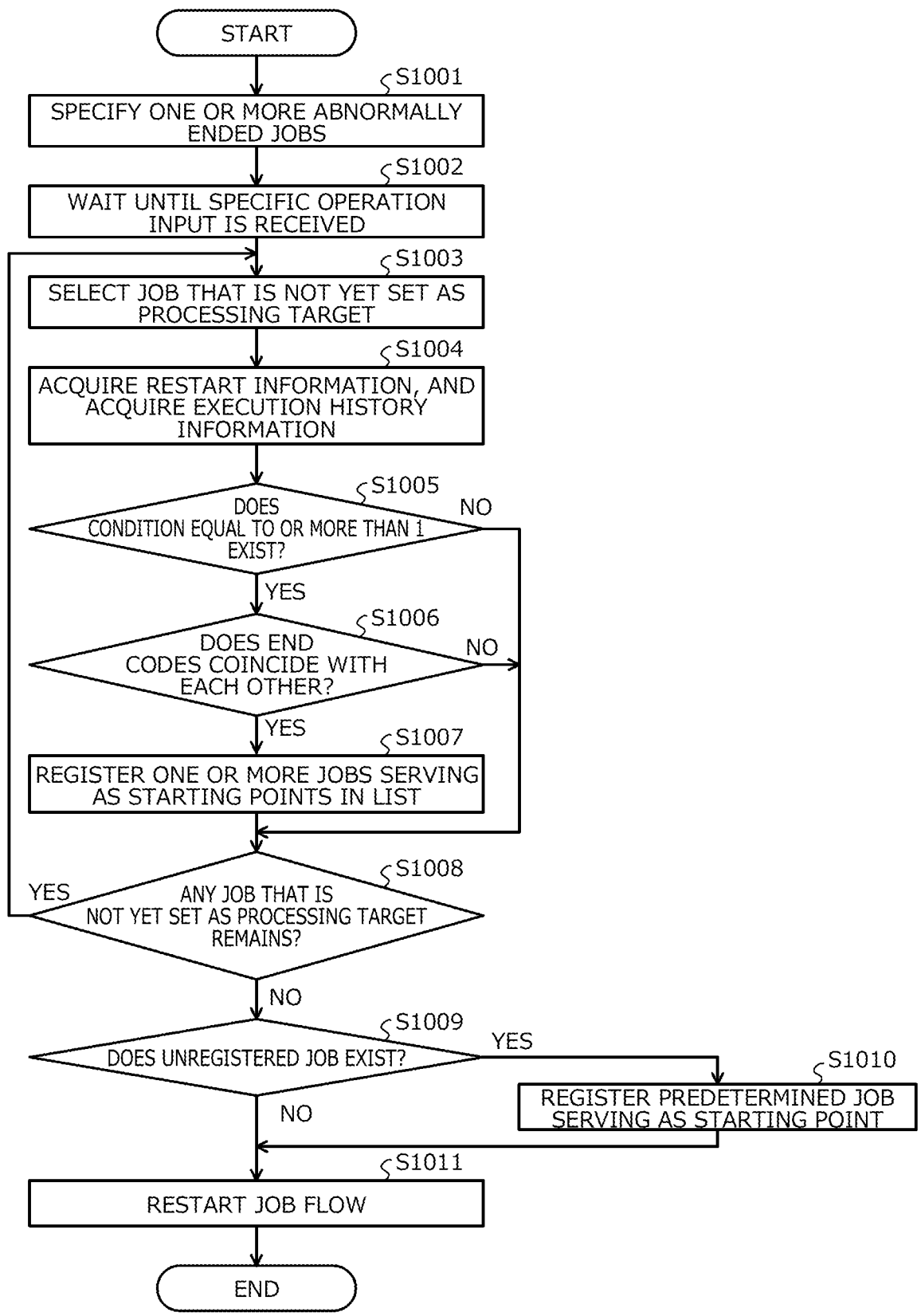
FIG. 10 is a flowchart illustrating an example of a restart processing procedure.

FIG. 10 is a flowchart illustrating the example of the restart processing procedure. As illustrated in FIG. 10, the information processing apparatus 100 refers to the execution history management table 800 to specify one or more abnormally ended jobs, based on a job status (step S1001). The information processing apparatus 100 outputs the one or more abnormally ended jobs such that a user of the information processing apparatus 100 may refer to the one or more jobs, and waits until a specific operation input by the users of the information processing apparatus 100 is received (step S1002).

Next, among the one or more specified jobs, the information processing apparatus 100 selects a job that is not yet set as a processing target (step S1003). The information processing apparatus 100 refers to the restart information management table 700 to acquire one or more pieces of restart information corresponding to the selected job, and refers to the execution history management table 800 to acquire execution history information corresponding to the selected job (step S1004).

Next, based on the acquired one or more pieces of restart information, the information processing apparatus 100 determines whether or not one or more conditions corresponding to the selected job exist (step S1005). In a case where one or more conditions do not exist (No in step S1005), the information processing apparatus 100 proceeds to processing in step S1008. On the other hand, in a case where one or more conditions exist (Yes in step S1005), the information processing apparatus 100 proceeds to processing in step S1006.

At step S1006, the information processing apparatus 100 determines whether or not an end code indicated by the acquired execution history information coincides with any end code indicated by at least one restart information of the acquired one or more pieces of restart information (step S1006). In a case where the end codes do not coincide with each other (No in step S1006), the information processing apparatus 100 proceeds to the processing in step S1008. On the other hand, in a case where the end codes coincide with each other (Yes in step S1006), the information processing apparatus 100 proceeds to processing in step S1007.

At step S1007, the information processing apparatus 100 specifies one or more jobs serving as a starting point indicated by the one restart information having the coincident end code, and registers the specified one or more jobs in a list in association with the selected job (step S1007).

Next, the information processing apparatus 100 determines whether or not a job that is not yet set as a processing target remains (step S1008). In a case where a job that is not yet set as a processing target remains (Yes in step S1008), the information processing apparatus 100 proceeds to processing in step S1003. By contrast, in a case where a job that is not yet set as a processing target does not remain (No in step S1008), the information processing apparatus 100 proceeds to processing in step S1009.

At step S1009, the information processing apparatus 100 determines whether or not an unregistered job that is not associated with one or more jobs serving as a starting point in the list among the abnormally ended one or more jobs exists (step S1009). In a case where no unregistered job exists (No in step S1009), the information processing apparatus 100 proceeds to processing in step S1011. By contrast, in a case where an unregistered job exists (Yes in step S1009), the information processing apparatus 100 proceeds to the processing in step S1010.

At step S1010, the information processing apparatus 100 registers, for each unregistered job, a predetermined job serving as a starting point in the list in association with the unregistered job (step S1010). The predetermined job is, for example, the unregistered job serving as a starting point, a job executed immediately before the unregistered job, a job at a head of a job flow in which an execution order is forward from an execution order of the unregistered job, or the like. The information processing apparatus 100 proceeds to the processing in step S1011.

At step S1011, the information processing apparatus 100 restarts the job flow from each of one or more jobs registered in the list as a starting point such that the same job is not executed repeatedly, as a starting point (step S1011). The information processing apparatus 100 ends the restart processing. Thus, the information processing apparatus 100 may restart the job flow.

The information processing apparatus 100 may execute the processing by interchanging the order of the processing of some steps illustrated in FIG. 10. For example, the order of the processing in steps S1005 and S1006 may be interchanged. For example, the processing in step S1002 may be performed after step S1008. The information processing apparatus 100 may omit the processing of some steps illustrated in FIG. 10. For example, the processing in step S1002 may be omitted.

As described above, with the information processing apparatus 100, it is possible to detect an abnormality of a first job in a job group in which an execution order is defined for a job flow. With the information processing apparatus 100, it is possible to store, in the storage unit 400, a condition for restarting the job flow and information indicating a job serving as a starting point from which the job flow is to be restarted in the job group, in association with at least one job of the job group. With the information processing apparatus 100, it is possible to determine whether or not the detected abnormality of the first job satisfies the condition for restarting the job flow, which is associated with the first job, by referring to the storage unit 400. With the information processing apparatus 100, in a case where it is determined that the condition is satisfied, it is possible to restart the job flow from a second job as a starting point based on the information indicating the second job as the starting point from which the job flow is to be restarted, which is associated with the first job, by referring to the storage unit 400. Thus, the information processing apparatus 100 may appropriately restart the job flow. With the information processing apparatus 100, it is possible to flexibly control a starting point from which the job flow is to be restarted.

With the information processing apparatus 100, it is possible to store, in the storage unit 400, a condition for restarting a job flow and information indicating a plurality of jobs serving as starting points from which the job flow is to be restarted in a job group, in association with a first job. With the information processing apparatus 100, in a case where it is determined that the condition is satisfied, it is possible to restart the job flow from each job of the plurality of jobs based on the information indicating the plurality of jobs serving as starting points from which the job flow is to be restarted, which are associated with the first job, as a starting point. A plurality of starting points for restarting the job flow may be set in the information processing apparatus 100.

With the information processing apparatus 100, it is possible to store a condition representing a type of abnormality of the first job in the storage unit 400. With the information processing apparatus 100, it is possible to determine whether or not the type of abnormality of the detected first job coincides with a type of abnormality of the first job represented by the condition for restarting the job flow, which is associated with the first job, by referring to the storage unit 400. With the information processing apparatus 100, in a case where the types coincide with each other, it is possible to determine that the detected abnormality of the first job satisfies the condition for restarting the job flow, which is associated with the first job. Thus, the information processing apparatus 100 may flexibly control a starting point from which the job flow is to be restarted, in accordance with the type of abnormality of the first job.

With the information processing apparatus 100, when an abnormality of the first job is detected, it is possible to determine whether or not a condition for restarting the job flow associated with the first job exists, by referring to the storage unit 400. With the information processing apparatus 100, in a case where it is determined that the condition does not exist, it is possible to restart the job flow from any job set in advance among the first job, a job immediately before the first job, and a head job of the job flow, as a starting point. Thus, the information processing apparatus 100 may restart the job flow even when the condition is not set.

With the information processing apparatus 100, in a case where it is determined that the condition is not satisfied, it is possible to restart the job flow from any job set in advance among the first job, a job immediately before the first job, and a head job of the job flow as a starting point. Thus, even in a case where the abnormality of the first job does not satisfy the set condition, the information processing apparatus 100 may restart the job flow.

With the information processing apparatus 100, in a case where it is determined that the condition is satisfied, it is possible to wait until a predetermined operation input of a user is received. With the information processing apparatus 100, it is possible to restart the job flow after waiting until the predetermined operation input of the user is received. Thus, the information processing apparatus 100 enables the user to create room for handling the abnormality of the first job.

The information processing method described in the present embodiment may be implemented by causing a computer, such as a PC or a workstation, to execute a program prepared in advance. The information processing program described in the present embodiment is recorded on a computer-readable recording medium and is read from the recording medium to be executed by the computer. The recording medium is a hard disk, a flexible disk, a compact disc (CD)-ROM, a magneto optical (MO) disc, a Digital Versatile Disc (DVD), or the like. The information processing program described in the present embodiment may be distributed via a network, such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program causing a computer to execute a process comprising:
   detecting an abnormality of a first job in a job group, which has an execution order defined in a job flow;
   determining, by referring to a memory that stores, in association with at least one job in the job group, a condition for restarting the job flow and information which indicates a job as a starting point from which the job flow is to be restarted in the job group, whether or not the detected abnormality of the first job satisfies a condition for restarting the job flow, which is associated with the first job; and
   restarting, in a case where it is determined that the detected abnormality of the first job satisfies the condition for restarting the job flow, which is associated with the first job, by referring to the memory, based on information which indicates a second job as a starting point from which the job flow is to be restarted, and is associated with the first job, the job flow from the second job as the starting point,
   wherein the memory stores, in association with the first job, a condition for restarting the job flow and information which indicates a plurality of jobs as starting points from which the job flow is to be restarted in the job group, and in the restarting, it is determined about whether the detected abnormality of the first job is a specific type of abnormality and, in a case where it is determined that the detected abnormality of the first job is the specific type of abnormality, it is determined that the condition for restarting the job flow, which is associated with the first job, is satisfied, and, by referring to the memory, based on the information indicating the plurality of jobs as starting points from which the job flow is to be restarted, which is associated with the first job, the job flow is restarted from each of the plurality of jobs as the starting point,
   wherein another job behind the second job serving as the starting point is executed in the execution order and, in accordance with the job flow, another job that is not executed among the other jobs in parallel with the second job serving as the starting point is executed.

2. The non-transitory computer-readable recording medium according to claim 1,
   wherein the condition represents a type of abnormality of the first job, and
   in the determining,
   by referring to the memory, in a case where a type of the detected abnormality of the first job coincides with the type of abnormality of the first job represented by the condition for restarting the job flow, which is associated with the first job, it is determined that the detected abnormality of the first job satisfies the condition for restarting the job flow, which is associated with the first job.

3. The non-transitory computer-readable recording medium according to claim 1,
   wherein in a case where the abnormality of the first job is detected, in a case where by referring to the memory, it is determined that the condition for restarting the job flow, which is associated with the first job, does not exist, the job flow is restarted from any one job set in advance among the first job, a job immediately before the first job, and a head job of the job flow as a starting point.

4. The non-transitory computer-readable recording medium according to claim 1,
   wherein in a case where the abnormality of the first job is detected, in a case where by referring to the memory, it is determined that the detected abnormality of the first job does not satisfy the condition for restarting the job flow, which is associated with the first job, the job flow is restarted from any one job set in advance among the first job, a job immediately before the first job, and a head job of the job flow as a starting point.

5. The non-transitory computer-readable recording medium according to claim 1,
   wherein in the restarting,
   in a case where it is determined that the detected abnormality of the first job satisfies the condition for restarting the job flow, which is associated with the first job, after waiting until a predetermined operation input of a user is received, by referring to the memory, based on the information which indicates the second job as a starting point from which the job flow is to be restarted, and is associated with the first job, the job flow is restarted from the second job as the starting point.

6. An information processing method comprising:
   detecting an abnormality of a first job in a job group, which has an execution order defined in a job flow;
   determining, by referring to a memory that stores, in association with at least one job in the job group, a condition for restarting the job flow and information which indicates a job as a starting point from which the job flow is to be restarted in the job group, whether or not the detected abnormality of the first job satisfies a condition for restarting the job flow, which is associated with the first job; and restarting, in a case where it is determined that the detected abnormality of the first job satisfies the condition for restarting the job flow, which is associated with the first job, by referring to the memory, based on information which indicates a second job as a starting point from which the job flow is to be restarted, and is associated with the first job, the job flow from the second job as the starting point, wherein the memory stores, in association with the first job, a condition for restarting the job flow and information which indicates a plurality of jobs as starting points from which the job flow is to be restarted in the job group, and in the restarting, it is determined about whether the detected abnormality of the first job is a specific type of abnormality and, in a case where it is determined that the detected abnormality of the first job is the specific type of abnormality, it is determined that the condition for restarting the job flow, which is associated with the first job, is satisfied, and, by referring to the memory, based on the information indicating the plurality of jobs as starting points from which the job flow is to be restarted, which is associated with the first job, the job flow is restarted from each of the plurality of jobs as the starting point, wherein another job behind the second job serving as the starting point is executed in the execution order and, in accordance with the job flow, another job that is not executed among the other jobs in parallel with the second job serving as the starting point is executed.

7. An information processing apparatus comprising:
a memory; and
a processor coupled to the memory and configured to:
detect an abnormality of a first job in a job group, which has an execution order defined in a job flow;
determine, by referring to the memory that stores, in association with at least one job in the job group, a condition for restarting the job flow and information which indicates a job as a starting point from which the job flow is to be restarted in the job group, whether or not the detected abnormality of the first job satisfies a condition for restarting the job flow, which is associated with the first job; and restart, in a case where it is determined that the detected abnormality of the first job satisfies the condition for restarting the job flow, which is associated with the first job, by referring to the memory, based on information which indicates a second job as a starting point from which the job flow is to be restarted, and is associated with the first job, the job flow from the second job as the starting point, wherein the memory stores, in association with the first job, a condition for restarting the job flow and information which indicates a plurality of jobs as starting points from which the job flow is to be restarted in the job group, and in a process to restart, it is determined about whether the detected abnormality of the first job is a specific type of abnormality and, in a case where it is determined that the detected abnormality of the first job is the specific type of abnormality, it is determined that the condition for restarting the job flow, which is associated with the first job, is satisfied, and, by referring to the memory, based on the information indicating the plurality of jobs as starting points from which the job flow is to be restarted, which is associated with the first job, the job flow is restarted from each of the plurality of jobs as the starting point, wherein another job behind the second job serving as the starting point is executed in the execution order and, in accordance with the job flow, another job that is not executed among the other jobs in parallel with the second job serving as the starting point is executed.

* * * * *